United States Patent [19]

Hedahl

[11] 4,363,175
[45] Dec. 14, 1982

[54] TRUCK WHEEL CLAMP

[75] Inventor: Richard N. Hedahl, Bismarck, N. Dak.

[73] Assignee: FMC Corporation, Chicago, Ill.

[21] Appl. No.: 237,341

[22] Filed: Feb. 23, 1981

[51] Int. Cl.³ .................... G01B 5/255; G01B 11/275
[52] U.S. Cl. ........................................ 33/288; 33/299; 33/336; 248/205 R
[58] Field of Search ................. 33/288, 264, 299, 335, 33/336, 337, 203.18; 248/201, 205 R, 225.3; 356/155

[56] References Cited

U.S. PATENT DOCUMENTS

| | | | |
|---|---|---|---|
| 2,475,502 | 7/1949 | Holmes | 356/155 |
| 2,882,608 | 4/1959 | Tursman | 248/205 R |
| 3,709,451 | 1/1973 | Graham | 248/205 R |
| 4,167,817 | 9/1979 | Hunter | 33/299 |
| 4,180,326 | 12/1979 | Chang | 356/155 |
| 4,180,915 | 1/1980 | Lill et al. | 33/336 |
| 4,285,136 | 8/1981 | Ragan | 33/288 |

FOREIGN PATENT DOCUMENTS

| | | | |
|---|---|---|---|
| 1219662 | 5/1960 | France | 33/288 |
| 2025064 | 1/1980 | United Kingdom | 33/336 |

*Primary Examiner*—Richard R. Stearns
*Attorney, Agent, or Firm*—H. M. Stanley; R. B. Megley

[57] ABSTRACT

A wheel clamp for supporting a wheel aligning device in a plane generally parallel to the plane of the wheel is disclosed. The wheel clamp includes a frame and a lower bracket attached to one end of the frame, said lower bracket having a support shaft projecting therefrom for supporting the wheel aligning device. An upper bracket slides on the frame in order to adjust the wheel clamp for wheels of different diameter. A set of levels attached to the lower bracket indicates when the clamp, together with the wheel, lies at a first orientation and also when the clamp has been rotated through 90° and 180°. The wheel clamps will frequently be used in pairs with left-hand and right-hand clamps being provided. The levels on each clamp of the pair are oriented so that each wheel clamp may be rotated to a predetermined position so that the wheel aligning tools on each wheel clamp are at the same elevation.

4 Claims, 6 Drawing Figures

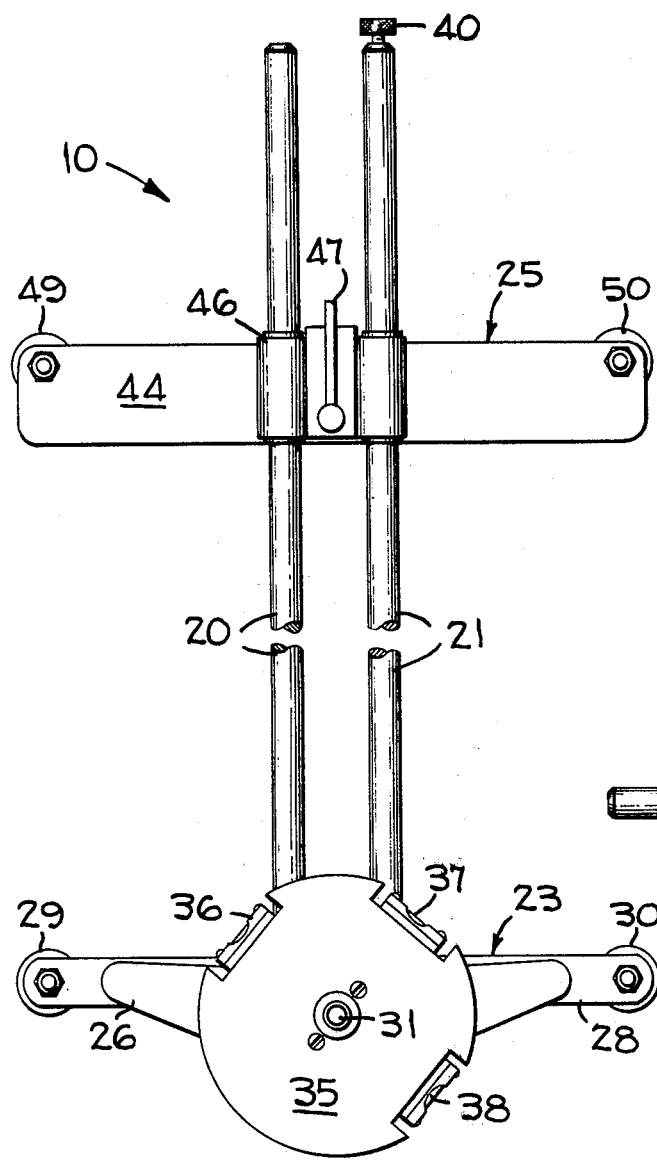
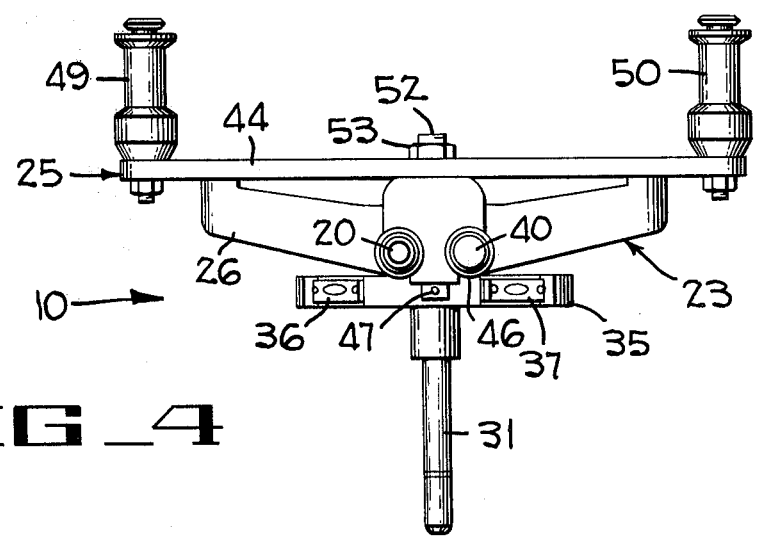

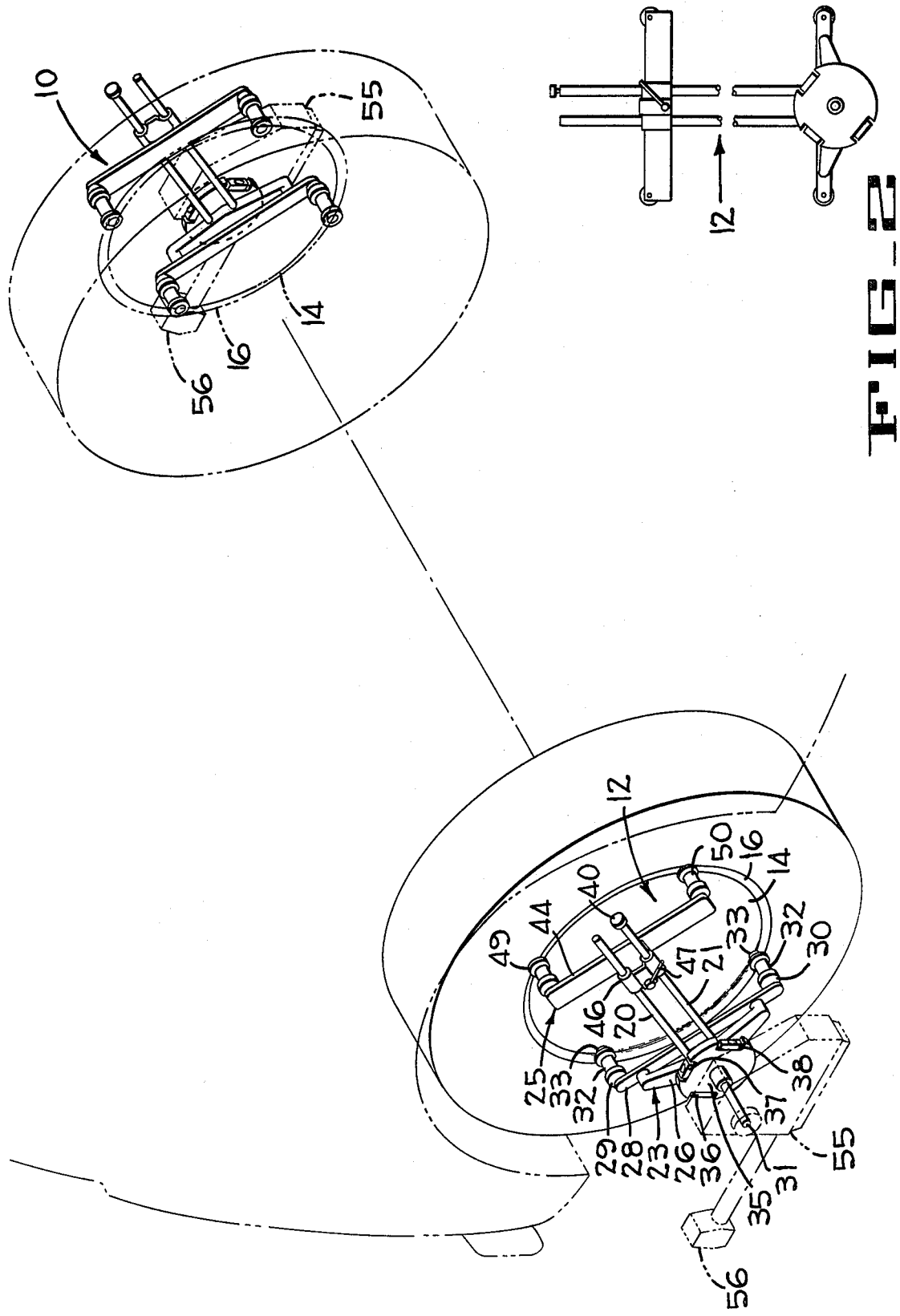
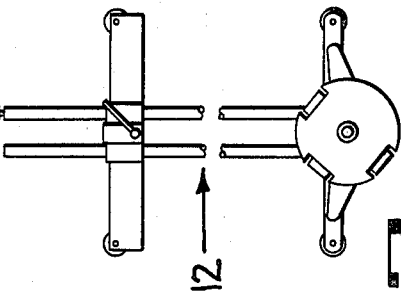

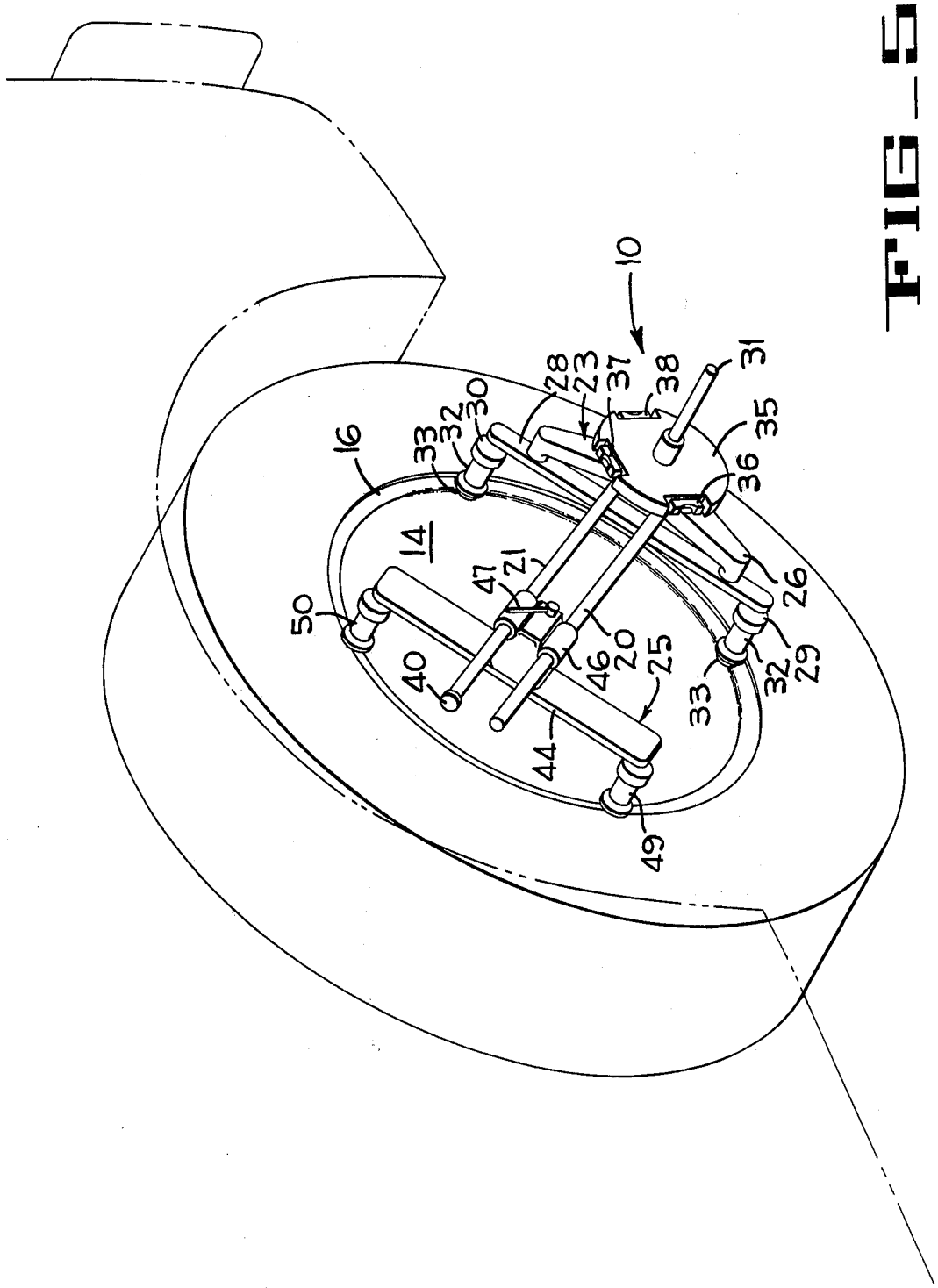
FIG_5

TRUCK WHEEL CLAMP

BACKGROUND OF THE INVENTION

1. Field of the Invention

This invention relates generally to the wheel alignment art and more particularly relates to wheel clamps which engage a wheel rim to support a wheel alignment measuring device in a plane generally parallel to the plane of the wheel rim.

2. Description of the Prior Art

Wheel clamps of varying design have long been used to support wheel alignment measuring devices in a plane generally parallel to the plane of the wheel rim. Typically, the clamp will have three or four rim-engaging fingers adapted to grasp a peripheral lip extending around the wheel rim and projecting outward therefrom. An outwardly extending shaft is aligned with the center of the wheel and is attached to the wheel clamp for supporting the wheel alignment measuring device. Such a wheel clamp is disclosed in the U.S. Pat. No. 2,475,502, to Holmes issued on July 5, 1949.

The wheel alignment measuring device that is supported by the wheel clamp may be any of a variety of devices well-known in the field. The wheel clamp of the present invention is designed in particular to support a projector which is mounted on the front wheel of the vehicle to project a beam toward a second projector mounted by a second clamp on the opposite front wheel. Each projector has a plurality of light sources to project a plurality of beams, one at a time, in a diverging pattern. Each projector also has a detector to sense the presence of beams projected from the opposite projector. Circuitry is provided to identify the beam which is detected, at any angle of toe of the wheel, to thereby provide a reading for the angle of toe. Such a projector is described in U.S. Pat. No. 4,180,326 to Chang, issued on Dec. 25, 1979.

The wheel alignment measuring device of the aforedescribed patent includes a base which is journaled for free rotation on the clamp shaft so that the device remain in its pendulous position as the wheel (and clamp) is rotated. A gravity sensor included within the base detects the vertical deflection of the wheel as the wheel is rotated. A barrel extending forward of the base includes an array of light emitting diodes (LED's) for projecting beams used in detecting the toe of the front wheels. A detector head mounted at the forward end of the barrel includes a 45° mirror for projecting the array of beams transversely with respect to the vehicle so that they may be detected by the second wheel alignment measuring devise mounted on the opposite vehicle wheel.

The operation of such a wheel alignment measuring system is well described in the patent to Chang, referenced hereinbefore, and in U.S. Pat. No. 4,150,897 to Roberts Jr, et al. To understand the present invention, it is necessary only to note that the barrel of the device must extend forward of the front of the tire and, in some cases, in front of the vehicle in order for the pair of projectors to communicate with one another. With prior wheel clamps, this has required that the barrel be long enough to extend from the center of the wheel past the front of the tire. With large vehicles, such as trucks, the distance between the center and the front of the wheel requires a barrel of excessive length. It becomes more difficult, and thus more expensive, to produce the larger projector required for use on trucks and other large vehicles.

SUMMARY OF THE INVENTION

The present invention solves the aforementioned problem by providing a support shaft on the wheel clamp which is well below the wheel axis when in use. This location reduces the length of the barrel necessary both by decreasing the horizontal distance to the tire perimeter and by insuring that the projector beams will lie below the vehicle body. The wheel clamp includes a frame and a lower bracket fixedly attached to one end of the frame. The lower bracket has means for engaging the wheel rim whereby one end of the frame is removably attached to said wheel rim. A support shaft projects outward from the lower bracket. A sliding upper bracket is mounted on the frame and adjusts to correspond to the diameter of the particular wheel rim. The upper bracket also has means for engaging the wheel rim whereby the opposite end of the frame is removably attached thereto.

In one embodiment of the invention, a rotational guide is provided on the wheel clamp to indicate rotation of the wheel and the clamp through arcs of 90° beginning from a predetermined starting point, such guide being useful in determining (and allowing correction for) "runout" errors. When rotation of the wheel and clamp is stopped at a particular angle of rotation dictated by the rotational guide, the wheel alignment measuring device will be positioned properly (at the lower front of the wheel) so that it may communicate with the alignment measuring device mounted on the opposite wheel.

DESCRIPTION OF THE DRAWINGS

FIG. 1 is a front elevational view of the right hand embodiment of the wheel clamp of the present invention with a portion of the frame being broken away and removed.

FIG. 2 is a front elevational view of the left hand embodiment of the wheel clamp of the present invention with a portion of the frame being broken away and removed.

FIG. 3 is a side elevational view of the wheel clamp of FIG. 1.

FIG. 4 is a plan view of the wheel clamp of FIG. 1.

FIG. 5 is an isometric view of the right hand wheel clamp of the present invention mounted on a vehicle wheel.

FIG. 6 is an isometric view of the left hand and right hand wheel clamps mounted on the front wheels of a vehicle.

DESCRIPTION OF THE PREFERRED EMBODIMENT

FIGS. 1 and 2 illustrate the wheel clamp of the present invention. Specifically, FIG. 1 illustrates a wheel clamp 10 which is adapted to be mounted on the right front wheel rim 14 (see FIG. 5) of a vehicle, and FIG. 2 illustrates a wheel clamp 12 which is adapted to be mounted on the left front wheel rim 14 of a vehicle. Each wheel rim has a peripheral flange 16 to which the clamps are arranged to be physically attached. The terms right and left are with respect to the vehicle as viewed by the driver when seated in the vehicle. As explained hereinafter, the wheel clamps 10, 12 will normally be employed in pairs. Initially, however, the structure of the wheel clamp will be described in detail only with reference to the right hand clamp 10 of FIG. 1. The structure of the left hand clamp 12 of FIG. 2 is identical except for the orientation of the bubble levels 36, 37 and 38, the purpose of which will be explained hereinafter.

Referring to FIGS. 1, 3 and 4, the structure of the wheel clamp 10 will now be described in detail. The wheel clamp 10 includes a frame comprising a first rod 20 and a second parallel rod 21, both of which are fixedly mounted in a lower bracket 23. Adjustably mounted on the frame is an upper bracket 25 which is slidably received on the parallel rods 20, 21, as described in detail hereinafter.

The lower bracket 23 comprises a cast body 26 having two holes 27 adapted to fixedly receive the parallel rods 20, 21. A crossbar 28 is attached to the rear of the cast body 26 and extends generally transversely of the wheel clamp 10. Rear is defined as the side of the wheel clamp adjacent to the wheel rim when said wheel clamp is mounted on the vehicle. A first rim-engaging finger 29 and a second rim-engaging finger 30 are bolted to opposite ends of the crossbar 28 and project rearwardly therefrom. As shown on FIG. 3, each rim-engaging finger comprises a spindle-shaped body 32 and a spaced, generally cylindrical tooth 33 with a sharp circumferential projecting edge which bites into the wheel rim, as described hereinafter.

Mounted on the front of the cast body 26 is a flat disc 35 having three bubble levels 36, 37, and 38 spaced 90° apart along its perimeter. The first bubble level 36 is located at the 10:30 position when the wheel clamp 10 is held vertically, as shown in FIG. 1. The second bubble level 37 is located 90° in the clockwise direction relative to the first bubble level (the 1:30 position), and the third bubble level 38 is located 180° from the first bubble level (the 4:30 position). The bubble levels are used to aid in "run-out" calculations as shown and described, for example, in U.S. Pat. No. 4,180,915 issued on Jan. 1, 1980. Additionally, the center bubble level 37, is used to orient the wheel so that the wheel aligning device supported by the wheel clamp 10 will be at the proper elevation during the wheel alignment operations.

A spindle 31 projects outward from the center of the face of the disc 35 and is attached thereto. The spindle 31 serves to pendulously support the wheel alignment measuring device during alignment operations.

As shown in FIG. 1, the parallel rods 20 and 21 project upward from the lower bracket 23, and the second rod 21 terminates with an enlarged end cap 40 which prevents the upper bracket 25 from sliding off the frame during normal operation. The end cap 40 has a threaded shank which is screwed into the top of the rod 21, the end cap thereby being removable so that the upper bracket 25 may be taken off the frame if desired.

The upper bracket 25 consists of a crossbar 44 mounted on the rear of a clutch-clamp mechanism 46. A rotatable lever 47 is provided in the clutch-clamp mechanism which, in the position shown in FIG. 1, permits free sliding movement of the upper bracket on the support rods 20, 21. The lever may be rotated in either direction to fix the position of the upper bracket 25 relative to the parallel rods 20, 21 by means of a camming device which locks a clutch plate into gripping engagement with the support rods. The construction of the clutch-clamp mechanism 46 is wholly conventional and fully described in the aforementioned U.S. Pat. No. 2,475,502 to Holmes. For the purposes of the present explanation, it is necessary only to understand that the position of the upper bracket 25 may be fixed to correspond to the diameter of the wheel rim on which the wheel clamp is to be mounted.

Rim-engaging fingers 49, 50 are bolted to opposite ends of the crossbar 44 and project rearwardly therefrom. The construction of the fingers 49, 50 is similar to that of fingers 29, 30, described hereinbefore. The crossbar 44 is mounted for rotational adjustment on a bolt 52 projecting rearwardly from the clutch-clamp mechanism 46, the crossbar being secured in position on the bolt by a nut 53. The crossbar 44 is adjustably rotatable relative to the frame of the wheel clamp in order to compensate for irregularities in the wheel rim to which the device is attached.

The wheel clamps 10, 12 are each intended to temporarily support a wheel aligning device 55 (FIG. 6) on a wheel rim 14 (FIGS. 5,6) while the alignment characteristics of the wheels are checked. Such a wheel aligning device is described, for example, in the U.S. Pat. No. 4,150,897, to Roberts, Jr. et al and U.S. Pat. No. 4,180,326, to Chang, as previously pointed out. The wheel aligning device described therein includes a light projector 56 which extends forward of the main body of the device and projects multiple light beams transversely with respect to the vehicle axis. A similar wheel aligning device mounted on the opposite front wheel receives the pair of light beams and is able to compute the wheel alignment (toe) therefrom. It will be appreciated that the light projector must extend forward of the front wheel and below the vehicle chassis so that the projected beams may travel to the opposite side of the vehicle. Also, for such a wheel aligning device to accurately perform its function, the plane of the device must be maintained parallel to the plane of the wheel rim 14 being examined. To achieve this parallel relationship, it is necessary to mount the wheel clamp 10, (or 12) so that the spindle 31 is perpendicular to the plane of the rim 14. Using the present invention, such perpendicular mounting may be achieved in the following manner.

The wheel clamp 10 (or 12) is lifted and the lower rim engaging fingers 29,30 are placed so that the teeth 33 on the end of the fingers bitingly engage the peripheral flange 16 (FIG. 5) on the wheel rim 14. When the fingers 29, 30 at the bottom of the wheel clamp are resting on the flange 16, the position of the upper bracket 25 along the parallel rods 20, 21 is adjusted until the upper rim-engaging fingers 49, 50 also engage the peripheral flange 16. Note that the crossbar 44 of the upper bracket 25 may be rotated so that both rim engaging fingers 49, 50 will firmly engage the peripheral lip. Once such engagement has been achieved, the upper bracket 25 may be fixed in place by rotating the lever 47, as described hereinbefore, which locks it onto the support rods 20, 21. Such mounting of the wheel clamp 10 is illustrated in FIG. 5.

FIG. 6 illustrates the relative positions of the left hand wheel clamp 12 and the right hand wheel clamp 10 after run-out calculations have been performed and as they would be positioned during the alignment measuring operations. Note that the spindle 31 of the left wheel clamp 12 lies in the lower front quadrant of the wheel and that the longitudinal axis of the clamp lies at a 50° angle with the horizontal. This is achieved by leveling the center bubble level 37. The projector barrel of the wheel alignment measuring device extends forward of the vehicle tire and lies beneath the vehicle chassis. Since the bubble levels on both of the wheel clamps 10, 12 are oriented so that the axis of the wheel clamps lie at a 50° angle, both wheel aligning devices are maintained at the same elevation. In this way, the projectors of the wheel alignment measuring devices are able to communicate with one another.

Although the best mode contemplated for carrying out the present invention has been herein shown and described, it will be apparent that modification and variation may be made without departing from what is regarded to be the subject matter of the invention.

What is claimed is:

1. A clamp for supporting a wheel aligning tool on a wheel rim, said clamp comprising:
   a frame;
   a lower bracket attached to one end of the frame;
   means attached to the lower bracket for engaging the wheel rim by which the one end of the frame can be removably attached to the wheel rim;
   a shaft attached to the lower bracket, said shaft being configured to support the wheel aligning tool rotatably thereon;
   means attached in fixed relationship with said frame for indicating a plurality of predetermined angular positions of said frame,
   an upper bracket slidably mounted at the opposite end of the frame, the distance between the upper and lower brackets being adjustable to correspond to the diameter of the wheel rim; and
   means mounted on the upper bracket for engaging the wheel rim by which the opposite end of the frame can be removably attached to the wheel rim.

2. A clamp for supporting a wheel aligning tool on a wheel rim, said clamp comprising:
   a frame;
   a lower bracket attached to one end of the frame;
   means attached to the lower bracket for engaging the wheel rim by which the one end of the frame can be removably attached to the wheel rim;
   a projecting member attached to the lower bracket for supporting the wheel aligning tool rotatably thereon;
   level indicating means attached to the lower bracket for indicating when the wheel rim and wheel clamp have been rotated to at least one predetermined angle relative to horizontal;
   an upper bracket slidably mounted at the opposite end of the frame, the distance between the upper and lower brackets being adjustable to correspond to the diameter of the wheel rim; and
   means mounted on the upper bracket for engaging the wheel rim by which the opposite end of the frame can be removably attached to the wheel rim, said projecting member having an axis for rotation of the wheel aligning tool which is substantially parallel to but displaced radially from the axis of rotation of the wheel rim on which the clamp is mounted.

3. A clamp for supporting a wheel aligning tool on a wheel rim, said clamp comprising:
   a frame;
   a lower bracket attached to one end of the frame;
   means attached to the lower bracket for engaging the wheel rim by which the one end of the frame can be removably attached to the wheel rim;
   a projecting member attached to the lower bracket for supporting the wheel aligning tool;
   a disc having a plane parallel to the plane of the clamp, three bubble levels having longitudinal axes lying in the plane of the disc and arranged to indicate a first predetermined rotational position, a second rotational position 90° removed from the first rotational position, and a third rotational position 180° removed from the first rotational position;
   an upper bracket slidably mounted at the opposite end of the frame, the distance between the upper and lower brackets being adjustable to correspond to the diameter of the wheel rim; and
   means mounted on the upper bracket for engaging the wheel rim by which the opposite end of the frame can be removably attached to the wheel rim.

4. A wheel clamp system for simultaneously supporting a first wheel aligning tool from a first vehicle wheel rim and a second wheel aligning tool from a second vehicle wheel rim, said first and second wheel rims being transversely opposite one another with respect to the vehicle axis, said wheel clamp system comprising:
   a first wheel clamp including a first bracket affixed to one end of said clamp, said first bracket carrying means to engage said first wheel rim, a first aligning tool support shaft on said first bracket configured to accept the first aligning tool for rotation thereon whereby said first shaft is situated on said wheel clamp at a location closer to the perimeter of the wheel rim than to the rotational axis of the wheel rim, and a first level indicator attached to said first bracket at a predetermined orientation with respect to the wheel clamp, whereby the wheel and clamp may be rotated to a predetermined angle with respect to horizontal as indicated by said level indicator so that the wheel aligning tool is supported on said first support shaft at a particular elevation and attitude below the axis of the wheel; and
   a second wheel clamp including a second bracket affixed to one end of said clamp, said second bracket carrying means to engage said second wheel rim, a second aligning tool support shaft on said second bracket configured to accept the second aligning tool for rotation thereon whereby said second shaft is situated on said second wheel clamp at a location closer to the perimeter of the wheel rim than to the rotational axis of the wheel rim, and a second level indicator attached to said second bracket with an orientation opposite to that of the first level indicator on the first wheel clamp, whereby the second wheel aligning tool will be supported on said second support shaft at the same elevation and attitude as the first wheel aligning tool when the second wheel and clamp are rotated to the angle determined by the second level indicator.

* * * * *